United States Patent
Gross et al.

(10) Patent No.: US 7,338,989 B2
(45) Date of Patent: Mar. 4, 2008

(54) AQUEOUS COATING MATERIAL, METHOD OF PRODUCING THE SAME AND USE THEREOF

(75) Inventors: Lutz-Werner Gross, Haltern (DE); Ludwig Moorkamp, Münster (DE); Heinz-Ulrich Grumpe, Sende (DE)

(73) Assignee: BASF Coatings AG, Munster (DE)

( * ) Notice: Subject to any disclaimer, the term of this patent is extended or adjusted under 35 U.S.C. 154(b) by 696 days.

(21) Appl. No.: 10/415,202

(22) PCT Filed: Nov. 27, 2001

(86) PCT No.: PCT/EP01/13793

§ 371 (c)(1), (2), (4) Date: Apr. 24, 2003

(87) PCT Pub. No.: WO02/42387

PCT Pub. Date: May 30, 2002

(65) Prior Publication Data

US 2004/0043157 A1 Mar. 4, 2004

(30) Foreign Application Priority Data

Nov. 27, 2000 (DE) .............................. 100 58 870

(51) Int. Cl.
*C08L 63/00* (2006.01)
*B32B 27/38* (2006.01)

(52) U.S. Cl. ..................... 523/404; 523/402; 523/403; 523/414; 428/414; 428/416

(58) Field of Classification Search ................ 523/400, 523/402, 403, 404, 414, 420; 428/413, 414, 428/416, 418
See application file for complete search history.

(56) References Cited

U.S. PATENT DOCUMENTS

| 4,263,352 A | 4/1981 | Kaltenbach et al. ......... 427/379 |
| 4,315,044 A | 2/1982 | Elmore et al. .............. 427/386 |
| 4,555,412 A | 11/1985 | Günter et al. ................. 427/27 |
| 5,461,090 A * | 10/1995 | Sweet ......................... 523/404 |
| 6,177,487 B1 | 1/2001 | Sapper et al. ............... 523/333 |
| 6,344,501 B1 | 2/2002 | Sierakowski et al. ....... 523/410 |

FOREIGN PATENT DOCUMENTS

| WO | WO 94/06876 | 3/1994 |
| WO | WO 97/17390 | 5/1997 |
| WO | WO 99/50359 | 10/1999 |

* cited by examiner

*Primary Examiner*—Michael J. Feely

(57) ABSTRACT

An aqueous coating material comprising at least one epoxy resin as binder and at least one polyamine as curing agent, wherein said epoxy resin or at least one of the epoxy resins (i) is solid per se at room temperature and/or is present in a powder coating material, and
(ii) the solid epoxy resin and/or the epoxy resin powder coating material is or are present in fine dispersion in an aqueous dispersion comprising the polyamine or polyamines;
and the use of the aqueous coating material to produce antistonechip primers.

10 Claims, No Drawings

AQUEOUS COATING MATERIAL, METHOD OF PRODUCING THE SAME AND USE THEREOF

CROSS REFERENCE TO RELATED APPLICATIONS

This application is a National Phase Application of Patent Application PCT/EP01/13793 filed on 27 November, which claims priority to DE 100 58 870.0, filed on 27 Nov. 2000.

The present invention relates to a novel aqueous coating material. The present invention additionally relates to a novel process for preparing the novel aqueous coating material. The present invention further relates to the use of the novel coating material for producing primers for protecting exposed surfaces against damage by mechanical effects, especially for producing antistonechip primers for automobiles and commercial vehicles.

Antistonechip primers and coating materials from which they are produced are known. The antistonechip primers are highly elastic intermediate primers which take on the function of protecting the exposed surfaces of automobiles and commercial vehicles against stone chipping. They are normally produced from coating materials based on polyester resin binders and melamine resin or polyisocyanate crosslinking agents. In the production of thick-film compositions, however, these coating materials give rise to problems. Thick-film compositions are nevertheless necessary in the bodywork regions at particular risk of stonechipping, such as the underbody area or wheel arches. Besides a high level of low-temperature elasticity and long-term elasticity, these compositions are required to have good abrasion resistance and must not be sensitive to moisture. The materials used for this purpose are based predominantly on PVC, and to a lesser extent on bitumen. The film thicknesses are in general between 500 and 1,500 µm. However, these antistonechip primers cause numerous problems when it comes to disposal. For this reason, a recent development is the lining of the wheel arches with internal plastic moldings, which need to be manufactured specially for each individual body.

A key step forward in solving the problems tied up with the customary and known antistonechip primers has been made by the coating materials which comprise water-thinnable epoxy resin dispersions and polyacrylate dispersions as binders and water-thinnable polyamines as curing agents. These aqueous coating materials are stable on storage, are easy to remove without residue from the application equipment, and can be disposed of without problems. Moreover, they lend themselves readily to application in a high film thickness, and give antistonechip primers which, at a film thickness of 500 µm and even after water storage, withstand up to 100 kilograms of steel chips until worn down to the substrate, in the VDA [German carmakers' association] stonechip test. Despite the advantages afforded by these known aqueous coating materials, they are capable of still further improvement in order to meet the constantly rising demands of the manufacturers of automobiles and commercial vehicles, and of their customers.

It is an object of the present invention to provide a new aqueous coating material based on water-thinnable epoxy resin dispersions and physically curing polymer dispersions as binders and on water-thinnable polyamines as curing agents which continues to have the advantages of the known coating material, but which is further improved in its steadfastness. Moreover, the new coating material is to provide primers for protecting exposed surfaces against damage by mechanical effects, especially antistonechip primers for automobiles and commercial vehicles, which have an improved protective effect. Additionally, the new aqueous coating material is to be easy to prepare.

Accordingly, we have found the novel aqueous coating material which comprises at least one epoxy resin as binder and at least one polyamine as curing agent, said epoxy resin or at least one of the epoxy resins (i) being solid per se at room temperature and/or being present in a powder coating material, and (ii) the solid epoxy resin and/or the epoxy resin powder coating material being present in fine dispersion in an aqueous dispersion comprising the polyamine or polyamines.

In the text below, the novel aqueous coating material is referred to as the "coating material of the invention".

Additionally, we have found the novel process for preparing the coating material of the invention, which involves dispersing at least one finely divided epoxy resin which is solid at room temperature, and/or at least one epoxy resin powder coating material, in an aqueous medium in the presence of at least one polyamine.

In the text below, the novel process for preparing the coating material of the invention is referred to as the "process of the invention".

Further subject matter of the invention will emerge from the description.

In the light of the prior art it was surprising and unforeseeable for the skilled worker that the object on which the present invention was based might be achieved by the addition of finely divided, solid epoxy resins and/or epoxy resin powder coating materials to aqueous dispersions containing polyamine. A particular surprise was that the measure afforded by the invention did not detract from the storage stability of the resultant coating materials of the invention, which was instead fully retained.

In a first preferred embodiment, the coating material of the invention is a one-component system in which all reactive components, i.e., the epoxy resins and the polyamines, are present alongside one another. In this case it is preferred to use exclusively epoxy resins which are solid at room temperature and/or epoxy resin powder coating materials.

In a second preferred embodiment, the coating material of the invention is a multicomponent system, in particular a two-component system, comprising (A) at least one polyamine-containing aqueous dispersion or solution as curing component and (B) at least one epoxy resin-containing aqueous dispersion as binder component, the solid epoxy resin and/or the epoxy resin powder coating material being present in fine dispersion in the curing component (A).

The epoxy resin-containing aqueous dispersion (B) preferably comprises at least one customary and known liquid epoxy resin of high reactivity toward polyamines.

Irrespective of whether the coating material of the invention is a one-component system or a multicomponent system, it comprises, based on its solids, the solid epoxy resin and/or the epoxy resin powder coating material in an amount which corresponds preferably to from 2 to 30, more preferably from 3 to 25, and in particular from 4 to 20% by weight of epoxy resin as reactive component.

Where the solid epoxy resin is used alone, it is present in the coating material of the invention in an amount of from 2 to 30, preferably from 3 to 25, and in particular from 4 to 20% by weight, based in each case on the solids of the coating material.

Where the epoxy resin powder coating material is used alone, it is present in the coating material of the invention preferably in an amount of from 5 to 30, more preferably from 6 to 25, and in particular from 7 to 20% by weight, based in each case on the solids of the coating material.

Preferably, the epoxy resin powder coating material comprises at least one epoxy resin in an amount of at least 40, more preferably at least 45, and in particular at least 50% by weight, based in each case on the powder coating material. The upper limit here is not critical. It is generally from 70 to 80% by weight, based on the powder coating material. Such an amount of epoxy resin ensures that sufficient epoxy resin is introduced as a reactive component into the coating material by the powder coating material.

For the coating material of the invention it is of advantage if the solid epoxy resins or the epoxy resin powder coating materials have a particle size <70, preferably <50, and in particular <30 µm. Further advantages result if the solid epoxy resins or epoxy resin powder coating materials have an average particle size of from 3 to 35, preferably form 3 to 20, and in particular from 3 to 15 µm.

Provided their storage stability is assured, the composition of the solid epoxy resins is not critical; rather, it is possible to use all customary and known, solid epoxy resins of high molecular mass, based on bisphenol A and F, having a number average molecular weight of from 1,000 to 10,000 daltons. These solid epoxy resins are commonly used in thermally curable, solventborne coating materials or powder coating materials (cf. Römpp Lexikon Lacke und Druckfarben, Georg Thieme Verlag, Stuttgart, N.Y., 1998, pages 196 and 197, "Epoxy resins"). They are commercially customary products, being sold for example by the company DOW under the tradename DOW® DER 662 or DOW® E.R. 642 U-20.

The composition of the epoxy resin powder coating materials is also not critical provided their storage stability is assured; rather, it is possible to use all customary and known, commercially available epoxy resin powder coating materials, with the proviso that they meet the conditions described above. Examples of suitable powder coating materials of this kind are described, for example, in the product information bulletin from BASF Lacke+Farben AG, "Pulverlacke" [Powder coating materials], 1990, or in the BASF Coatings AG brochure "Pulverlacke, Pulverlacke fur industrielle Anwendungen" [Powder coating materials, powder coatings for industrial applications], January 2000, or Römpp Lexikon Lacke und Druckfarben, Georg Thieme Verlag, Stuttgart, N.Y., 1998, pages 198 and 199, "Epoxy resin powder coating materials".

Suitable polyamines include all aliphatic, cycloaliphatic or aromatic, preferably aliphatic and/or cycloaliphatic amines containing at least two primary and/or secondary amino groups in the molecule, as are commonly used for curing epoxy resins (cf. Römpp Lexikon Lacke und Druckfarben, Georg Thieme Verlag, Stuttgart, N.Y., 1998, page 458, "Polyamines"). The amount of polyamines in the coating material of the invention may vary very widely and is guided primarily by the number of epoxy groups present. The amount is preferably from 1 to 15, more preferably from 1.2 to 12, and in particular from 1.3 to 10% by weight, based in each case on the solids of the coating material of the invention.

The epoxy resins present in component (B) of the multicomponent system of the invention are customary and known, commercially available epoxy resins of low molecular mass, having a number average molecular weight of from 400 to 2,000 daltons. These epoxy resins may be used as liquids or in the form of fine dispersions. The fine dispersions have an average particle size of <1 µm.

Besides the constituents described above, the coating material of the invention preferably further comprises at least one physically curable aqueous polymer dispersion.

In the context of the present invention, the concept of "physical curing" denotes the curing of a layer of a coating material by filming as a result of solvent loss from the coating material, with linking within the coating taking place by looping of the polymer molecules of the binders (regarding the term, cf. Römpp Lexikon Lacke und Druckfarben, Georg Thieme Verlag, Stuttgart, N.Y., 1998, "Binders", pages 73 and 74). Alternatively, filming takes place by coalescence of binder particles (cf. Römpp Lexikon Lacke und Druckfarben, Georg Thieme Verlag, Stuttgart, N.Y., 1998, "Curing", pages 274 and 275). Normally, no crosslinking agents are necessary for this to occur.

Examples of suitable physically curable polymer dispersions are polyacrylate dispersions or styrene-butadiene copolymer dispersions with a solids content of from 10 to 80% by weight. The physically curable polymer dispersions preferably have no functional groups which react with the reactive components of the coating materials of the invention. Preferably, the physically curable polymer dispersions are present in the coating materials of the invention in an amount of from 10 to 60, more preferably from 15 to 55, and in particular from 20 to 50% by weight, based in each case on the solids of the coating material of the invention.

Furthermore, the coating materials of the invention comprise customary and known fillers and pigments, preferably inorganic color pigments, in amounts customary for antistonechip primers.

Examples of suitable organic and inorganic fillers are chalk, calcium sulfates, barium sulfate, silicates such as talc, mica or kaolin, silicas, oxides, such as aluminum hydroxide or magnesium hydroxide, or organic fillers such as polymer powders, especially those of polyamide or polyacrylonitrile. For further details, reference is made to Römpp Lexikon Lacke und Druckfarben, Georg Thieme Verlag, 1998, pages 250 ff., "Fillers".

Examples of suitable inorganic color pigments are white pigments such as titanium dioxide, zinc white, zinc sulfide or lithopone; black pigments such as carbon black, iron manganese black or spinel black; color pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Furthermore, the coating material of the invention may comprise other color pigments and/or electrically conductive or magnetically shielding pigments and/or soluble dyes.

Examples of suitable organic color pigments are monoazo pigments, bisazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

Examples of suitable electrically conductive pigments are titanium dioxide/tin oxide pigments.

Examples of suitable magnetically shielding pigments are pigments based on iron oxides or chromium dioxide.

Suitable soluble organic dyes are lightfast organic dyes with little or no tendency to migrate from the surfacers and the basecoat materials or from the coatings produced from them. The migration tendency may be estimated by the skilled worker on the basis of his or her general knowledge in the art and/or with the aid of simple preliminary rangefinding tests, as part of tinting tests, for example.

For further details, reference is made to Römpp Lexikon Lacke und Druckfarben, Georg Thieme Verlag, 1998, pages 180 and 181, "Iron blue pigments" to "Black iron oxide", pages 451 to 453 "Pigments" to "Pigment volume concentration", page 563, "Thioindigo pigments" page 567 "Titanium dioxide pigments", pages 400 and 467 "Naturally occurring pigments", page 459, "Polycyclic pigments", page 52, "Azomethine pigments", "Azo pigments", and page 379, "Metal complex pigments".

Furthermore, the coating material of the invention may comprise additives such as low-boiling organic solvents and high-boiling organic solvents ("long solvents"), UV absorbers, light stabilizers, free-radical scavengers, defoamers, emulsifiers, wetting agents, dispersants, leveling agents, rheology control additives (thickeners), flame retardants, dryers, antiskinning agents, corrosion inhibitors and/or waxes in customary and known, effective amounts.

Examples of suitable low-boiling organic solvents and high-boiling organic solvents ("long solvents") are alcohols such as methanol, ethanol, propanol, isopropanol, n-butanol, sec-butanol, tert-butanol, amyl alcohol, isoamyl alcohol, 1-hexanol, 1-heptanol, 1-octanol, 2-octanol, isooctanol, 1-nonanol, 1-decanol, 2-decanol, 1-undecanol, 1-dodecanol, 1-tridecanol, 2-tridecanol, ethyl glycol, ethyl diglycol, methyl glycol, methyl diglycol, propyl glycol, propyl diglycol, butyl glycol or butyl diglycol or diols such as ethylene glycol, diethylene glycol, propylene glycol, dipropylene glycol, the butylene glycols or dibutylene glycol, amides such as N-methylpyrrolidone or xylenes or mixtures of aromatic and/or aliphatic hydrocarbons such as Solventnaphtha®, petroleum spirit $^{135}/_{180}$, dipentenes or Solvesso®.

Examples of suitable emulsifiers are nonionic emulsifiers, such as alkoxylated alkanols, polyols, phenols and alkylphenols or anionic emulsifiers such as alkali metal salts or ammonium salts of alkane carboxylic acids, alkanesulfonic acids, and sulfo acids of alkoxylated alkanols, polyols, phenols and alkylphenols.

Examples of suitable wetting agents are siloxanes, fluorine compounds, carboxylic monoesters, phosphoric esters, polyacrylic acids and their copolymers, or polyurethanes.

Examples of suitable rheology control additives (thickeners) are inorganic phyllosilicates such as aluminum magnesium silicates, sodium magnesium and sodium magnesium fluorine lithium phyllosilicates of the montmorillonite type; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride or ethylene-maleic anhydride copolymers and their derivatives or polyacrylates; or associative thickeners based on polyurethane, as described in Römpp Lexikon Lacke und Druckfarben, Georg Thieme Verlag, Stuttgart, N.Y., 1998, "Thickeners", pages 599 to 600, and in the textbook "Lackadditive" [Additives for coatings] by Johan Bieleman, Wiley-VCH, Weinheim, N.Y., 1998, pages 51 to 59 and 65.

Further examples of the additives set out above, and also examples of suitable UV absorbers, free-radical scavengers, leveling agents, flame retardants, dryers, antiskinning agents, corrosion inhibitors and waxes, are described in detail in the abovementioned textbook "Lackadditive" by Johan Bieleman, Wiley-VCH, Weinheim, N.Y., 1998.

The coating materials of the invention, and the curing component (A) used in the multicomponent systems of the invention, may be prepared with the aid of any appropriate processes. It is preferred to employ the process of the invention. In this case, at least one finely divided epoxy resin which is solid at room temperature, and/or at least one epoxy resin powder coating material, is dispersed in an aqueous medium in the presence of a polyamine. The components are used in amounts such as to give the compositions described above. The aqueous medium may be water. Alternatively, it is possible to use mixtures of water and small amounts of organic solvents customary in coating materials, such as butyl diglycol. When carrying out the process of the invention, it is also possible to incorporate the above-described additives into the coating materials of the invention or into the curing component (A).

For the multicomponent systems of the invention, the curing component (A) and the binder component (B) are not mixed with one another until shortly before application.

Viewed in terms of their methodology, the process of the invention and the preparation of the multicomponent systems of the invention from components (A) and (B) have no special features but instead may be carried out with the aid of customary and known apparatus for mixing solid and liquid components, such as stirred vessels, dissolvers, Ultraturrax or extruders or, in the case of the multicomponent systems, with the aid of customary and known two-component or multicomponent metering and mixing units.

The coating materials of the invention may be applied by any customary application method, such as spraying, knife coating, brushing, flow coating, dipping, impregnating, trickling or rolling, for example. The substrate to be coated may itself be at rest, with the application equipment or unit being moved. Alternatively, the substrate to be coated, in particular a coil, may be moved, with the application unit being at rest relative to the substrate or being moved appropriately.

Preference is given to the use of spray application methods, such as compressed air spraying, airless spraying, electrostatic spray application (ESTA), for example, alone or in conjunction with hot spray application such as hot air spraying, for example. Application may be carried out at temperatures of max. 70 to 80° C., so that suitable application viscosities are achieved without any change in or damage to the coating material during the brief period of thermal exposure. For instance, hot spraying may be configured in such a way that the coating material is heated only very briefly in the spray nozzle or shortly before the spray nozzle.

The uncured films applied possess a very good stability and show no tendency to form runs even on vertical surfaces.

Curing may take place after a certain rest period. This period may have a duration of from 5 minutes to 8 hours, preferably from 10 minutes to 2 hours, and in particular from 10 minutes to 60 minutes. The rest period serves, for example, for leveling and devolatilization of the applied films or for the evaporation of volatile constituents such as solvent or water. The rest period may be shortened and/or assisted by the use of elevated temperatures of up to 60° C., provided this does not cause any damage to or change in the applied films, such as premature complete crosslinking, for instance.

The thermal curing has no special features in terms of its method but instead takes place in accordance with the customary and known methods, such as heating in a forced air oven or irradiation with IR lamps. Thermal curing may also take place in stages. Advantageously, it takes place at a temperature <100° C. and preferably <90° C. for a period of from 1 minute up to 3 hours, with particular preference 20 minutes up to 2.5 hours, and in particular from 30 minutes to 2 hours.

The resulting primers are very suitable for coating substrates comprising a wide variety of materials, such as metal, plastic, wood, stone or concrete, or composites of these materials. The primers afford outstanding protection of the exposed parts of such substrates against damage caused by mechanical effects. Their suitability as antistonechip primers for automobiles and commercial vehicles is particularly outstanding. They retain their antistonechip activity over the long term, even at very low temperatures.

EXAMPLES AND COMPARATIVE EXPERIMENTS

Examples 1 and 2 and Comparative Experiment C1

The Preparation of Inventive Coating Materials (Examples 1 and 2) and of a noninventive Coating Material For Example 1, an inventive two-component (2K) coating material was prepared from the constituents given in Table 1.

For Example 2, an inventive one-component (1K) coating material was prepared from the constituents given in Table 1.

For Comparative Experiment C1, a noninventive two-component (2K) coating material was prepared from the constituents given in Table 1.

For Comparative Experiment C2, a noninventive one-component (1K) coating material was prepared from the constituents given in Table 1.

In accordance with the parts by weight given in Table 1, for Examples 1 and 2 and for Comparative Experiments C1 and C2, first of all the inorganic thickener was swollen in deionized water in a dissolver. Thereafter, the remaining constituents were added with stirring in the order indicated in Table 1, and the mixture was dispersed for 20 minutes using a dissolver stirrer. The temperature was held at from 40 to 45° C. during the mixing operation. Following dispersion, the coating materials were dispensed into containers through 400 μm sieve bags.

TABLE 1

The material composition of the inventive coating materials (Examples 1 and 2) and of the noninventive coating materials (Comparative Experiments C1 and C2)

| Constituent | Parts by weight: Examples | | Comparative Experiments | |
|---|---|---|---|---|
| | 1 (2K) | 2 (1K) | C1 (2K) | C2 (1K) |
| Curing component (A) or coating material: | | | | |
| Inorganic thickener[a] | 0.7 | 0.7 | 0.7 | 0.7 |
| Water | 11.5 | 12.5 | 11.5 | 12.5 |
| Black iron oxide | 1.1 | 1.2 | 1.1 | 1.2 |
| Titanium dioxide (rutile) | 6.5 | 6.8 | 6.5 | 6.8 |
| Aliphatic polyamine[b] | 7.8 | 3.0 | 7.8 | — |
| Butyl diglycol | 1.5 | 1.5 | 1.5 | 1.5 |
| Thickener[c] | 1.5 | 1.5 | 1.5 | 1.5 |
| Polyacrylate dispersion[d] | 31.5 | 33.2 | 31.5 | 36.2 |
| Defoamer[e] | 0.5 | 0.5 | 0.5 | 0.5 |
| Wetting agent[f] | 0.5 | 0.5 | 0.5 | 0.5 |
| Heavy spar | 20 | 21 | 20 | 21 |
| Finely divided solid epoxy resin[g] | 10 | 10.5 | — | — |
| Kaolin | — | — | 10 | 10.5 |
| Acrylate thickener[h] | 1.5 | 1.5 | 1.5 | 1.5 |
| Water | 5.4 | 5.6 | 5.4 | 5.6 |
| Binder component (B): | | | | |
| Epoxy resin dispersion[i] | 66 | — | 66 | — |
| Liquid epoxy resin[j] | 22 | — | 22 | — |
| Water | 12 | — | 12 | — |
| Mixing ratio (A):(B) | 100:30 | — | 100:30 | — |

[a] commercial inorganic phyllosilicate (Bentone ®);
[b] commercial aliphatic polyamine (80 percent; Beckopox ® EH 623);
[c] commercial thickener based on polyurethane (Rheolate ® 278);
[d] commercial polyacrylate dispersion (Acronal ® 290D);
[e] commercial defoamer (Bevaloid ® 681 FWG);
[f] commercial wetting agent (Pigmentverteiler A);
[g] powdered commercial solid epoxy resin, average particle size 10 μm (DOW ® DER 662);
[h] commercial thickener based on polyacrylate (25 percent; Latekoll ®);
[i] commercial epoxy resin dispersion (53%; Beckopox ® EP 384);
[j] commercial liquid epoxy resin (100%; Beckopox ® EP 075).

The inventive coating materials of Examples 1 and 2 had the same outstanding storage stability as the coating material of Comparative Experiment C1.

Examples 3 and 4 and Comparative Experiments C3 and C4

The Preparation of Inventive Antistonechip Primers (Examples 3 and 4) and of Noninventive Antistonechip Primers (Comparative Experiment C3 and C4)

For Example 3, the inventive coating material of Example 1 was used.

For Example 4, the inventive coating material of Example 2 was used.

For Comparative Experiment C3, the noninventive coating material of Comparative Experiment C1 was used.

For Comparative Experiment C4, the noninventive coating material of Comparative Experiment C2 was used.

To prepare the antistonechip primers of Example 3 and of Comparative Experiment C3 from the two-component systems of Example 1 and Comparative Experiment C1, the respective components (A) and (B) were mixed with one another in a weight ratio of from 100:3 (cf. Table 1).

The coating materials of Examples 1 and 2 and of Comparative Experiments C1 and C2 (cf. Table 1) were applied using an airless unit (nozzle aperture: D. 0.5 mm; paint pressure: 150 bar) at 23° C. and a relative atmospheric humidity of 60% to steel test panels which had been coated with a heat-cured cathodically departed electrocoat. The coated test panels were flashed off at room temperature for 15 minutes and then dried in a forced air oven at 80° C. for 60 minutes. The resulting antistonechip primers, which had a dry film thickness of 500 μm, were aged at 60° C. for 3 h.

The test panels were stored under constant climatic conditions in accordance with DIN 50017 for 24 h and after 5 h of regeneration were tested at room temperature.

The stonechipping test was carried out with a VDA stonechip tester from Erichsen (steel chips; pressure 1.5 bar; evaluation: statement of the amount of steel chips, in kilograms, until the coating is worn down to the substrate).

The stability was tested as follows: the test panels with the applied wet films of different thickness were placed vertically, and a horizontal line was drawn in the wet films in each case in the upper region of the test panels. The wet films were then baked at 80° C. in the vertical position. This gave antistonechip primers of different dry film thickness. The assessment criterion for the stability of an antistonechip primer was the dry film thickness up to which the line was still clearly visible and had not closed up.

The results of the test are given in Table 2.

TABLE 2

| | Test results | | | |
|---|---|---|---|---|
| | Examples: | | Comparative Experiments | |
| Test | 3 (2K) | 4 (1K) | C3 (2K) | C4 (1K) |
| VDA stonechipping (kg to penetration at 500 μm) | 250 | 80 | 100 | 30 |
| Stability (μm) | >700 | >700 | 500 | 600 |

The test results underscore the very good stability of the coating materials of the invention and the outstanding antistonechip effect of the antistonechip primers of the invention.

What is claimed is:

1. An aqueous coating material comprising a binder comprising at least one epoxy resin and a curing agent comprising at least one polyamine wherein at least one of the at least one epoxy resin
   (i) is present in a powder coating material, and
   (ii) is present in fine dispersion in an aqueous dispersion comprising the at least one polyamine.

2. The aqueous coating material of claim 1, wherein the aqueous coating material a one-component system.

3. The aqueous coating material of claim 1, wherein the powder coating material is present in an amount, based on the solids of the aqueous coating material, from 2 to 30% by weight of epoxy resin as reactive component.

4. The aqueous coating material of claim 1, wherein the epoxy resin powder coating material, used alone, is present in an amount of from 5 to 60% by weight, based on solids.

5. The aqueous coating material of claim 1, wherein the epoxy resin powder coating material comprises at least one epoxy resin in an amount of at least 40% by weight, based on the powder coating material.

6. The aqueous coating material of claim 1, wherein the epoxy resin powder coating material has an avenge particle size of from 3 to 35 μm.

7. The aqueous coating material of claim 1, wherein the epoxy resin powder coating material has a particle size <70 μm.

8. The aqueous coating material of claim 1 further comprising at least one physically curing polymer dispersion.

9. A process for preparing the aqueous coating material of claim 1 comprising, dispersing, at least one epoxy resin powder coating material in an aqueous medium in the presence of at least one polyamine.

10. The method of claim 9, wherein the coating is a primer comprising an antistonechip primer for at least one of an automobile and a commercial vehicle.

* * * * *